US007017931B1

(12) United States Patent
Hines

(10) Patent No.: US 7,017,931 B1
(45) Date of Patent: Mar. 28, 2006

(54) TRANSPORTATION APPARATUS

(76) Inventor: Robert M. Hines, 5085 FM 2001, Buda, TX (US) 78610

(*) Notice: Subject to any disclaimer, the term of this patent is extended or adjusted under 35 U.S.C. 154(b) by 212 days.

(21) Appl. No.: 10/352,592

(22) Filed: Jan. 28, 2003

(51) Int. Cl.
*B62K 17/00* (2006.01)

(52) U.S. Cl. ...................... 280/290; 280/278; 280/287; 224/575

(58) Field of Classification Search ................ 280/290, 280/293, 287, 278, 264, 259; 224/153, 575
See application file for complete search history.

(56) References Cited

U.S. PATENT DOCUMENTS

| | | | | |
|---|---|---|---|---|
| 3,836,177 | A * | 9/1974 | Heidt | 280/269 |
| 4,616,523 | A * | 10/1986 | Jones | 74/502.2 |
| 4,810,000 | A * | 3/1989 | Saunders | 280/293 |
| 4,981,306 | A * | 1/1991 | Young | 280/290 |
| 5,607,172 | A * | 3/1997 | Turi | 280/290 |
| 5,908,199 | A | 6/1999 | Rigato | |
| 6,595,539 | B1 * | 7/2003 | Belli | 280/287 |
| 6,695,334 | B1 * | 2/2004 | Irlbacher | 280/278 |

* cited by examiner

*Primary Examiner*—Lesley D. Morris
*Assistant Examiner*—Matthew Luby

(57) ABSTRACT

A personal transportation apparatus for a user, including a frame; front and rear wheels connected to the frame and being rotatable about respective front and rear axes, driving mechanism for driving at least one wheel of the apparatus, the driving mechanism being powered by the user, and a receiving structure within which the user fits to operate the apparatus. The receiving structure includes a seat and a frontal support for supporting a frontal torso region of the user, whereby the receiving area is connected to the frame and is positioned such that the user is in a generally upright position when wearing the apparatus.

26 Claims, 11 Drawing Sheets

TRANSPORTATION APPARATUS

BACKGROUND

1. Field of the Invention

The present invention is generally drawn to the field of personal transportation devices, and in particular, personal transportation devices that are powered by the user and which may be utilized for recreation as well as for transport.

2. Description of the Related Art

Conventional bicycles, as well as tricycles configured for adults, have been known to the public for many years. Bicycles take on many different overall dimensions and configurations for intended use, such as touring bicycles, road-racing bicycles, mountain bicycles, children's' bicycles, etc. Such bicycles share a common design, by utilizing generally pneumatic front and rear tires, the front wheel/tire assembly being rotatable by the steering axes for steering control, and a foot-operated crank assembly implemented for forward motion. Generally, the crank assembly is connected to the rear wheel for transfer of power, such as through a chain or a belt-driven means.

High-end bicycles intended for road use typically are configured such that the rider is somewhat hunched or bent over at the waist such that the upper torso forms a relatively small angle with respect to the horizontal plane, such as the plane which bisects the axes of the front and rear wheels (in the case of equally-sized front and rear wheels). While many users enjoy the aerodynamic benefits and control of such a body orientation, other users have long complained about upper body stress and pain due to this rather unnatural position.

Still further, a gap continues to exist in the art between sporting goods equipment such as roller skates, roller blades, ice skates, and skis, which are attached to the user in such a way that the user wears such devices, and sporting goods such as bicycles and bicycle-derivative apparatuses. In particular, the sporting goods equipment such as skates and skis, are intimately connected with the body and, in a sense, form an extension of the body when in use. On the other band, bicycle and bicycle-derivative apparatuses are generally not "worn" by the user, but rather operated by the user such that the user generally is mounted on the apparatus. Accordingly, beyond the need for improved ergonomics, there is also a general desire to develop sporting goods equipment that provide the utility, speed, and level of excitement of bicycle-derivative apparatuses, but yet provide the improved control and body-apparatus connection normally associated with devices such as skis or skates.

SUMMARY

According to one aspect of the invention, a personal transportation apparatus is provided which includes a frame, front and rear wheels connected to the frame and being rotatable about respective front and rear axes, a driving mechanism for driving at least one of the front and rear wheels, and a receiving structure within which the user fits. Of particular significance, the receiving structure includes a seat, and a frontal support for supporting a frontal torso region of the user, whereby the receiving area is connected to the frame such that the user is generally upright when wearing the apparatus. In this way, the apparatus is configured so as to permit ergonomically-friendly operation of the apparatus by the user. In particular embodiments, the receiving structure includes at least one restraint belt, which is configured to secure the apparatus to the user in a way so as to permit superior apparatus control, in a similar fashion to classes of sporting goods which include skis and skates, as described above.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
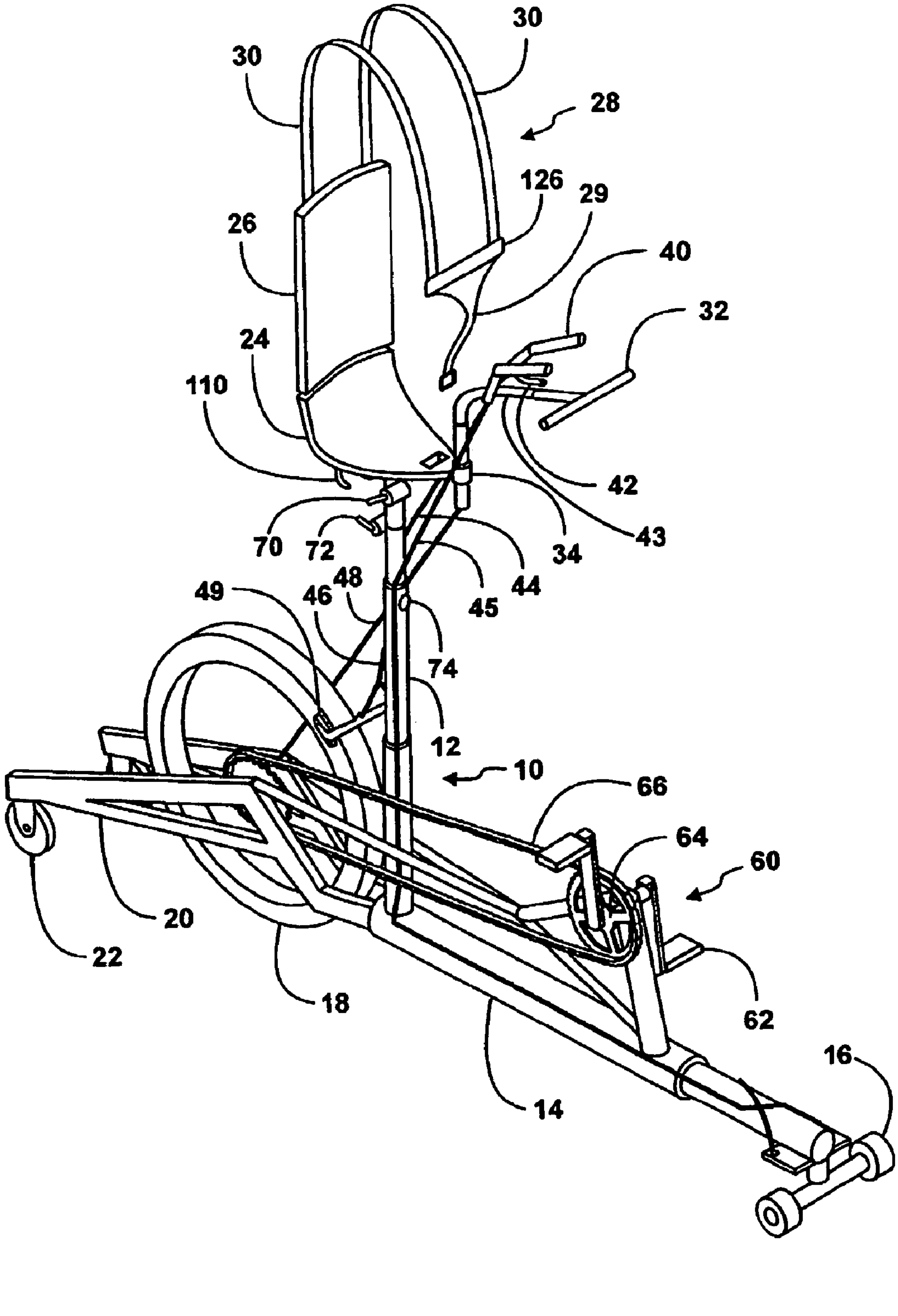
FIG. 1 is a perspective view of a first embodiment of the present invention.

Turning to FIG. 1, a first embodiment of the present invention is illustrated. The apparatus 1 fundamentally includes a frame 10 to which a variety of components are attached. The frame 10 essentially provides a skeletal structure for the apparatus 1. Frame 10 includes a vertically extending trunk 12 as well as a horizontally extending base 14. At a front end of the base 14, a set of front wheels 16 is provided, each of which rotates about a respective axes. At a rear end of the base 14, a rear wheel 18 is provided, which also rotates about its respective axes. In this particular embodiment, auxiliary wheels 22 are provided for rear stability, which are connected to a rear extension 20 of the base 14.

The apparatus 1 includes a receiving structure within which the user fits to operate the apparatus, the receiving structure including a seat 24. In this particular embodiment, a back or rear support 26 is provided to provide back support for the user. Further, a frontal support is provided to complement the back support 26. The frontal support includes a restraint belt in the form of harness 28. As shown in the drawing, the harness 28 includes a shoulder belt 30, designed so as to extend over at least one shoulder of the user. In this particular embodiment, the harness 28 includes right and left shoulder belts which respectively extend over respective right and left shoulders of the user, and are attached to the apparatus to hold the user in place (described in more detail in connection with drawings introduced herein below). Of particular significance, the illustrated embodiment includes a neck portion 43 which extends both upward and away from the user. The neck portion 43 includes a hand power handle 32, as well as steering control 40 extending from control pod 34. Power is delivered to the rear wheel from the hand power handle via power cable 48, which is described in more detail below. Control pod 34 and steering control 40 are provided just behind the power handle 32. Essentially, the control pod 34 and hand power handle 32 define the general areas where the user would place his or her hands during operation of the apparatus. These controls are positioned so as to allow the user to maintain a generally erect position during operation.

As illustrated, a brake lever 42 is integrated with steering control 40, brake lever 42 being connected to brake cable 46 which extends along trunk 12 and being connected to rear brake 49 to apply braking forces to the rear wheel during operation. The operation of the hand power handle 32 is described below in connection with other figures, but generally stated, the hand power handle may be manipulated by the user so as to translate a force to the rear wheel for forward motion. A steering control 40 may be generally rotated about its vertical axes to bias left and right steering cables, the left steering cable 44 illustrated in FIG. 1 for simplicity. The steering cables are routed down the trunk 12, along base 14, and are connected to the front wheel assembly to rotate the front wheels about a steering axes.

In complementary fashion with respect to the hand power handle 32, a foot operated driving mechanism is implemented. In this particular embodiment, the driving mechanism is in the form of crank assembly 60, which includes components conventionally found on modern bicycles. In particular, the crank assembly 60 includes a pedal 62 connected to a crank arm, which rotates and drives a sprocket 64 about a common rotational axes. Sprocket 64 is connected to a rear gear, which may be a freewheel to allow coasting, via chain 66. The positioning of the crank assembly 60 and the hand controls, including hand power handle 32 and control pod 34, is such that the user's torso maintains a generally upright and erect position during operation of the apparatus, while being able to comfortably manipulate the hand operable controls, as well as the foot-operated driving mechanism.

The vertically extending trunk 12 is height adjustable and collapsible. Although these features are described in more detail below, as generally shown in FIG. 1, a quick release lever 72 is provided for inseam or height adjustment of the trunk 12, and an adjustment pin 74 is provided for fine tuning height during operation, such as for operation of the apparatus over various terrain conditions, and also for collapsing the trunk 12. Further, a back support adjuster 110 is provided for fore and aft adjustment of the back support to accommodate different torso girths for different users. Further, a seat angle adjuster 70 is provided to fine-tune the upward sloping or downward sloping angle of the seat for maximum user comfort.

Figure 2:
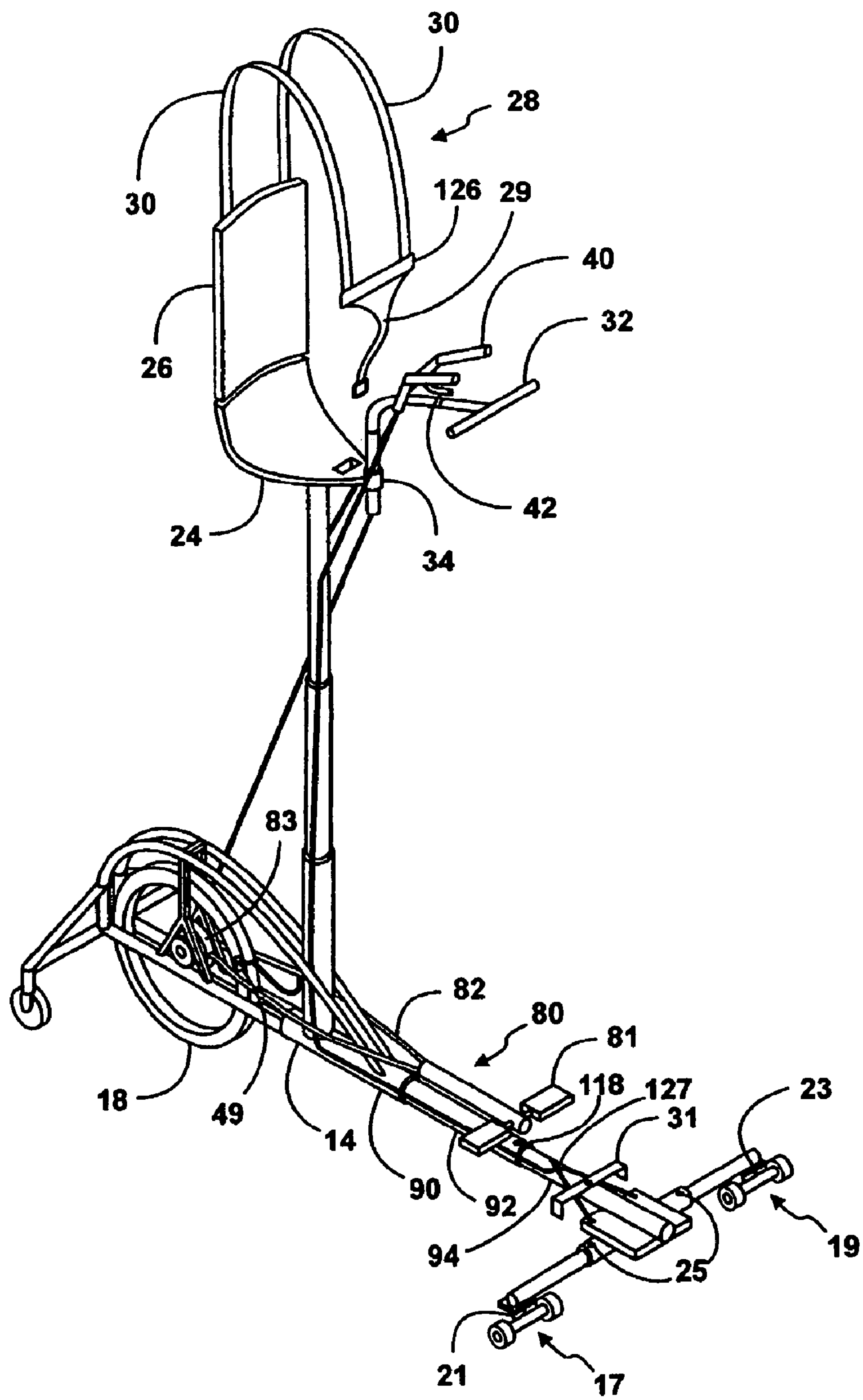
FIG. 2 is a perspective view of a second embodiment of the present invention.

Turning to FIG. 2, another embodiment of the present invention is illustrated. In this particular embodiment, among other changes, the apparatus is configured to use a more compact foot operable driving device rather than the crank assembly as illustrated in FIG. 1. Descriptions of elements that essentially parallel those discussed in connection with FIG. 1 are omitted herein. Turning to the frontal support structure forming a portion of the receiving structure, harness 28 is illustrated having right and left shoulder belts, terminating in a single crotch belt 29 which is configured in a manner similar to such belts used in automotive racing. Crotch belt 29 includes a single vertical extension terminating in a clip which is configured to clip into a latching mechanism within the seat 24, or otherwise attached to the frame. A transverse lap belt 126 integrates the shoulder belts 30 with the crotch belt 29, and is configured so as to generally rest against and provide support to the abdominal region of the user. As more clearly illustrated in FIG. 2, the steering control 40 of the control pod 34 is provided to pull and release left steering cable 44 and right steering cable 45 which are routed down the trunk 12, along base 14, criss-crossing at point 127, for connection to the front wheel assembly.

Turning to the foot operable driving means, a ratchet drive assembly 80 is provided to provide a driving force to rear wheel 18. The ratchet drive assembly includes a ratchet drive gear 83, which is engaged during a downward stroke movement of the lever arm assembly 82 when the user presses on foot rests 81. The ratchet drive gear 83 may be integrated with a biasing spring to bias the lever arm assembly 82 in an upward direction, readied for sequential downward pumping action of the lever arm assembly 82 to drive the apparatus in a forward direction.

Turning to the front wheel assembly, opposing pairs of roller-skate wheels are provided which rotate on respective axes. Each set of wheels includes what is known as a truck which permits slight pivoting of the pair of wheels in accordance with the direction of lean of the apparatus which is controlled by the user. The right pair of wheels 17 includes a right truck 21, and left pair of wheels 19 includes a left truck 23. The steering cables 44, 45 are connected to opposite sides of the wheel assembly so as to slightly bias the wheels and cause rotational movement in the steering direction intended by the user through steering control 40. Each set of wheels is connected to the frame through respective pivots 25, which permit folding of the wheels so as to engage clip 31 for storage and to move the wheels out of the way when the device is collapsed and worn by the user, discussed in more detail below. In this embodiment, the base 14 includes a main support 90, a retractable section 92, and a collapsible section 94, also discussed in more detail below.

Figure 3:
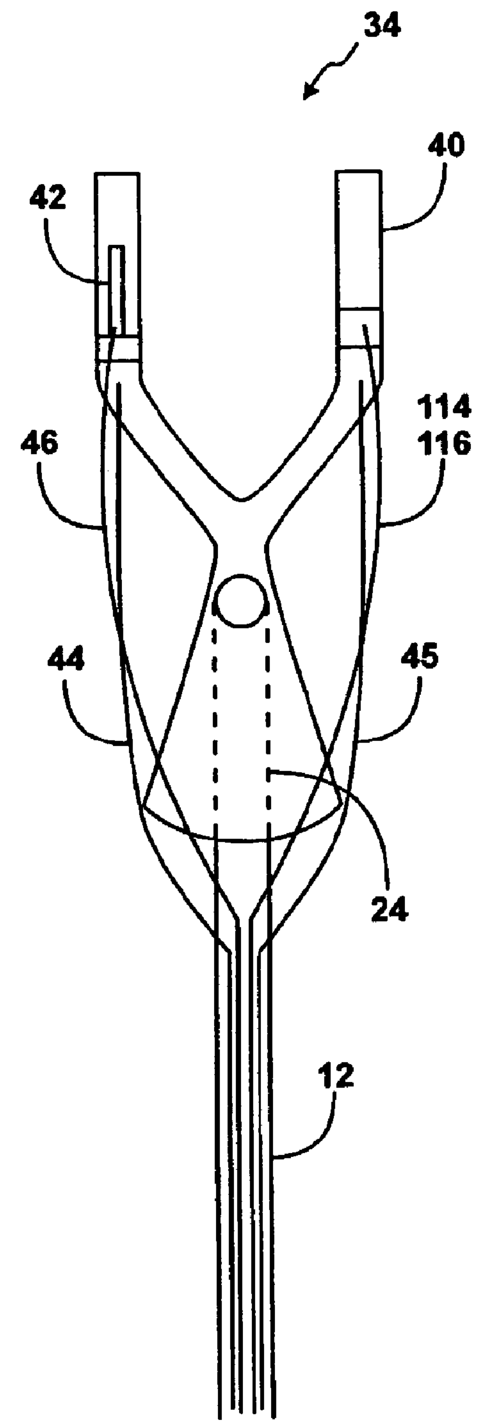
FIG. 3 is a frontal view of the neck portion which includes operating controls of the apparatus according to an embodiment of the present invention.

Turning to FIG. 3, a frontal view of the control pod 34 including steering control 40 is shown. As shown, the hand brake lever 42 is illustrated, being connected to brake cable 46, and routed down trunk 12. In a similar fashion, left and right steering cables 44, 45 are connected to the steering control 40 and also routed down trunk 12.

Figure 4:
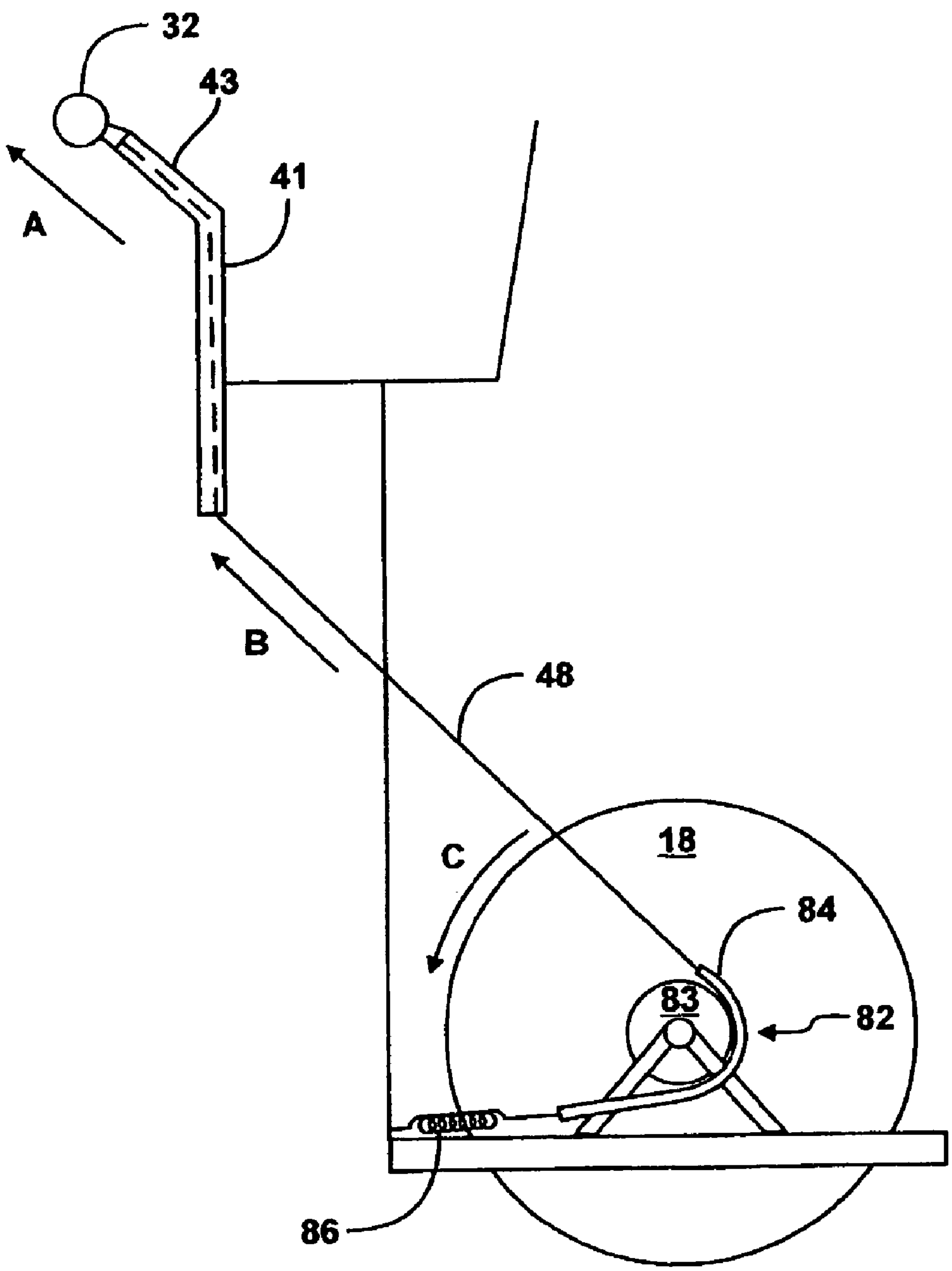
FIG. 4 is a schematic illustrating the operation of the hand-powered mechanism for powering the rear wheel of the apparatus.

Turning to FIG. 4, a schematic illustration of the hand operable driving mechanism is disclosed. As shown, hand power handle 32 is provided, which may be biased in a generally outward and upward direction as indicated by the arrow A. The power handle seats within housing 41, and is connected to a power cable 48. Power cable 48 is routed to the ratchet gear drive 82 and engages ratchet gear 83 via a chain 84. By biasing the handle in the direction shown by the arrow A, the power cable is pulled along direction B, thereby engaging ratchet drive gear 83 and driving the rear wheel in the forward direction shown by arrow C. The terminal end of the power cable 48 is connected to a spring 86 which provides a biasing force to not only maintain the power cable

48 and chain 84 in position, but also to provide a natural biasing force to pull the hand power handle 32 in a seated position within housing 41.

Figure 5:
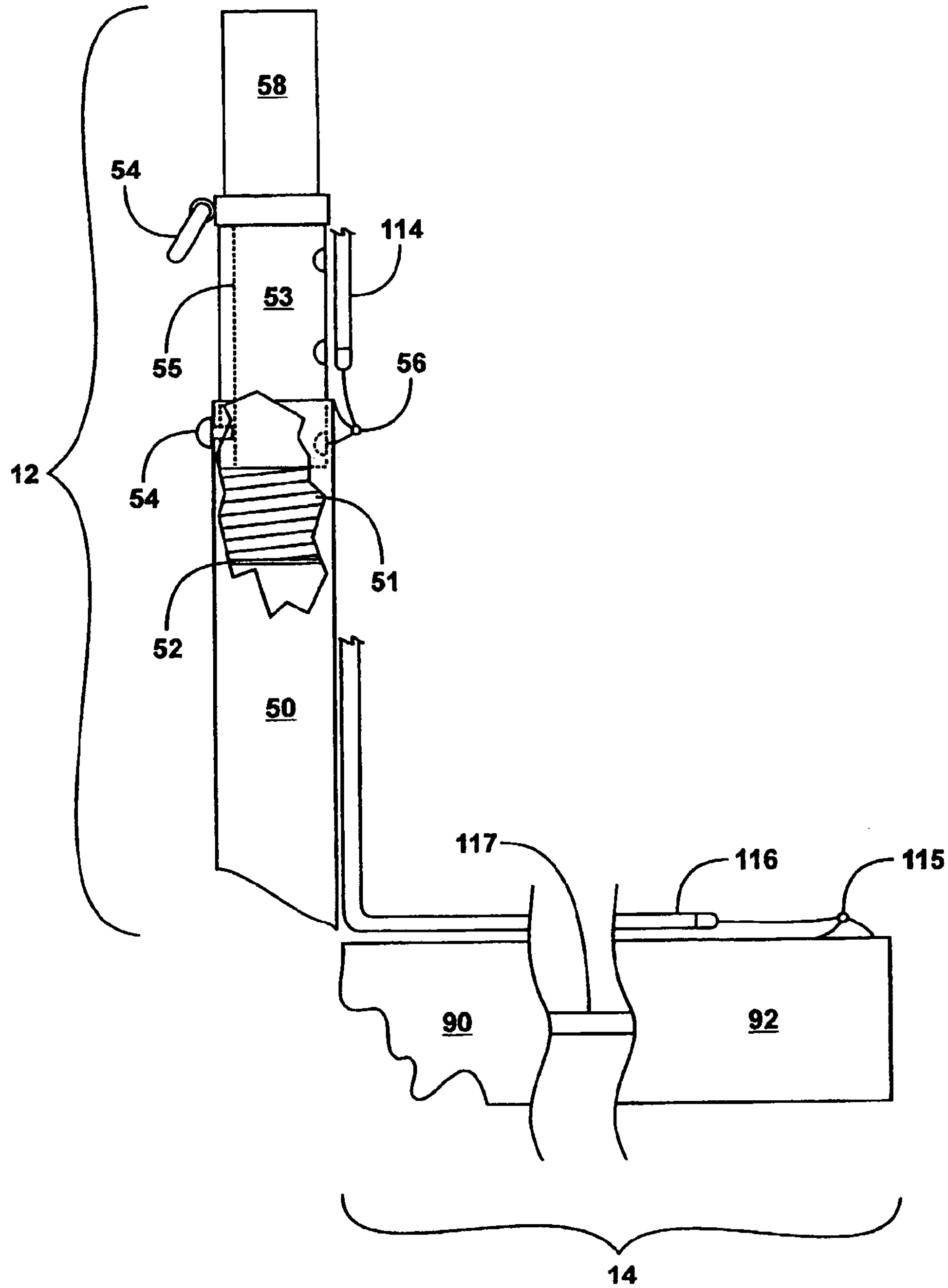
FIG. 5 illustrates the adjustability and collapsibility of the main trunk portion of the frame of the apparatus, as well as the collapsibility of the horizontal main section of the apparatus according to an embodiment of the present invention.
Figure 6:
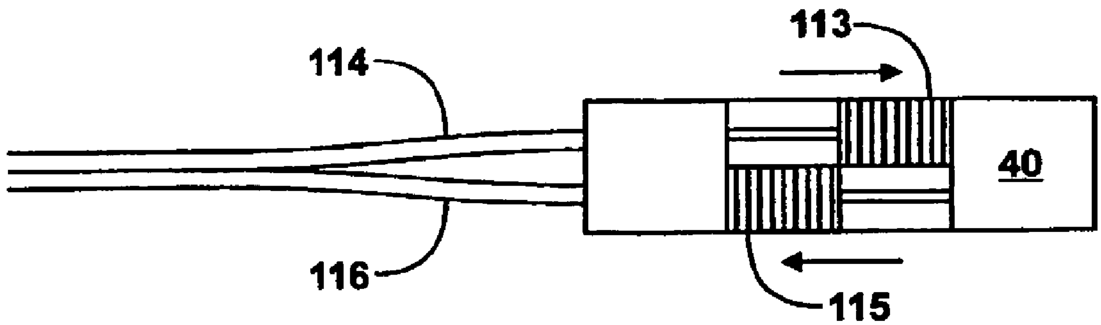
FIG. 6 illustrates the thumb-operable controls for collapsing the apparatus vertically and horizontally in accordance with the structure shown in FIG. 5.

Turning to FIG. 5, the details of the height adjustment and the collapsible nature of the trunk 12 as well as base 14 are illustrated. The main trunk portion 50 is illustrated as a large diameter tube, within which collapsing section 53 fits. The collapsing section 53 includes an axial groove 55 which is designed to be engaged by pin 54 for rotational stability. The height of collapsing section 53 is indexed via a series of axial holes that are engaged by height adjustment pin 56. The height adjustment pin 56 may be biased manually or by pushing on first release button 113 which is connected to first release cable 114, which is provided on the left extension of the steering control 40. Please refer to FIG. 6 for illustration of the first release button, and first release cable 114. Turning back to FIG. 5, the collapsible section 53 is present so as to be slidably positioned within main trunk portion 50. The collapsible section 53 is naturally biased in an upward direction by spring 51 which is held in place by a spring seat 52. In operation, when the pin is released, the user may apply weight to the seat to move the seat in a downward direction, or may lift off the seat to extend the collapsing section. The push button may be released at the appropriate indexed hole for the chosen height. This configuration allows easy vertical collapse of the apparatus for storage or for folding the apparatus while worn by the user, described in more detail below. In addition, the collapsible nature of the frame permits dynamic height adjustment while in use, such as lowered and extended positions for different handling characteristics of the apparatus. Still further the apparatus provides a vertical translational function, that is, jumping, through use of the collapsible trunk. The user may crouch and spring in an upward direction to jump with the entire apparatus for going over obstacles, for example. In addition, the collapsible section may be coupled with the rear wheel gear drive mechanism to provided forward translational force.

Further, telescoping section 58 is provided so as to fit within collapsible section 53. The telescoping section 58 is intended to provide general, fixed vertical height of the apparatus to match the inseam of the user, for optimal power transfer to the foot operable driving mechanism. The telescoping portion 58 may be adjusted relative to the collapsible section 53 by loosening the quick release lever 59 shown in FIG. 5.

Turning to the horizontal collapsibility of the base 14, the base 14 includes a main support 90 within which retractable section 92 fits. In a manner similar to the configuration of collapsible section 53 within main trunk portion 50 of the trunk, the retractable section 92 may be retracted within main support 90 by biasing a longitudinal adjustment pin by operating second release button 115 connected to second release cable 116, shown in FIG. 6. Turning back to FIG. 5, an elastic cable 117 is provided within the base 14 to provide a biasing or retraction force to bias retraction of the retractable section 92 into main support 90. Turning back to FIG. 2, it is noted that the collapsible section 94 may be collapsed into retractable section 92 by engaging a push button 118.

Figure 7:
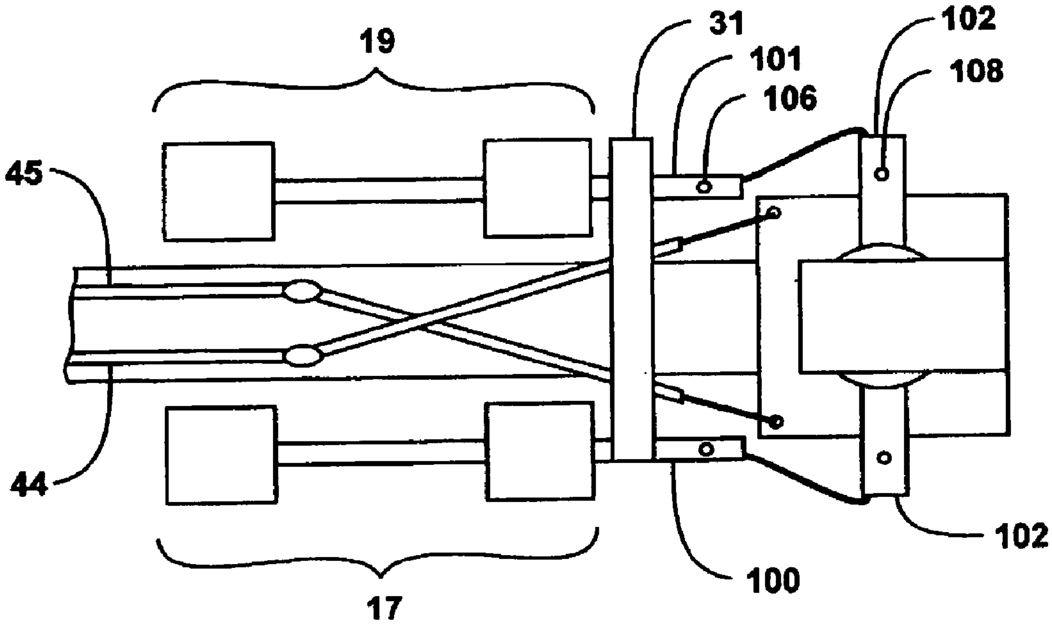
FIG. 7 illustrates a top view of the collapsibility of the front wheel structure according to an embodiment of the present invention.

Turning to FIG. 7, collapse of the left and right wheel assemblies is schematically shown. As illustrated, the right pair of wheels 17 and the left pair of wheels 19 are removed from respective receiving members 102, and positioned so as to be engaged by clip 31. The sets of wheels rotate on respective axles 100, 101, each of which is configured to slide into and fit within receiving members 102, which are essentially hollow tubes. Spring lock buttons 106 are provided so as to engage within complementary holes 108 and the receiving members 102 to lock the axles, and accordingly the wheels, in place.

Figure 8:
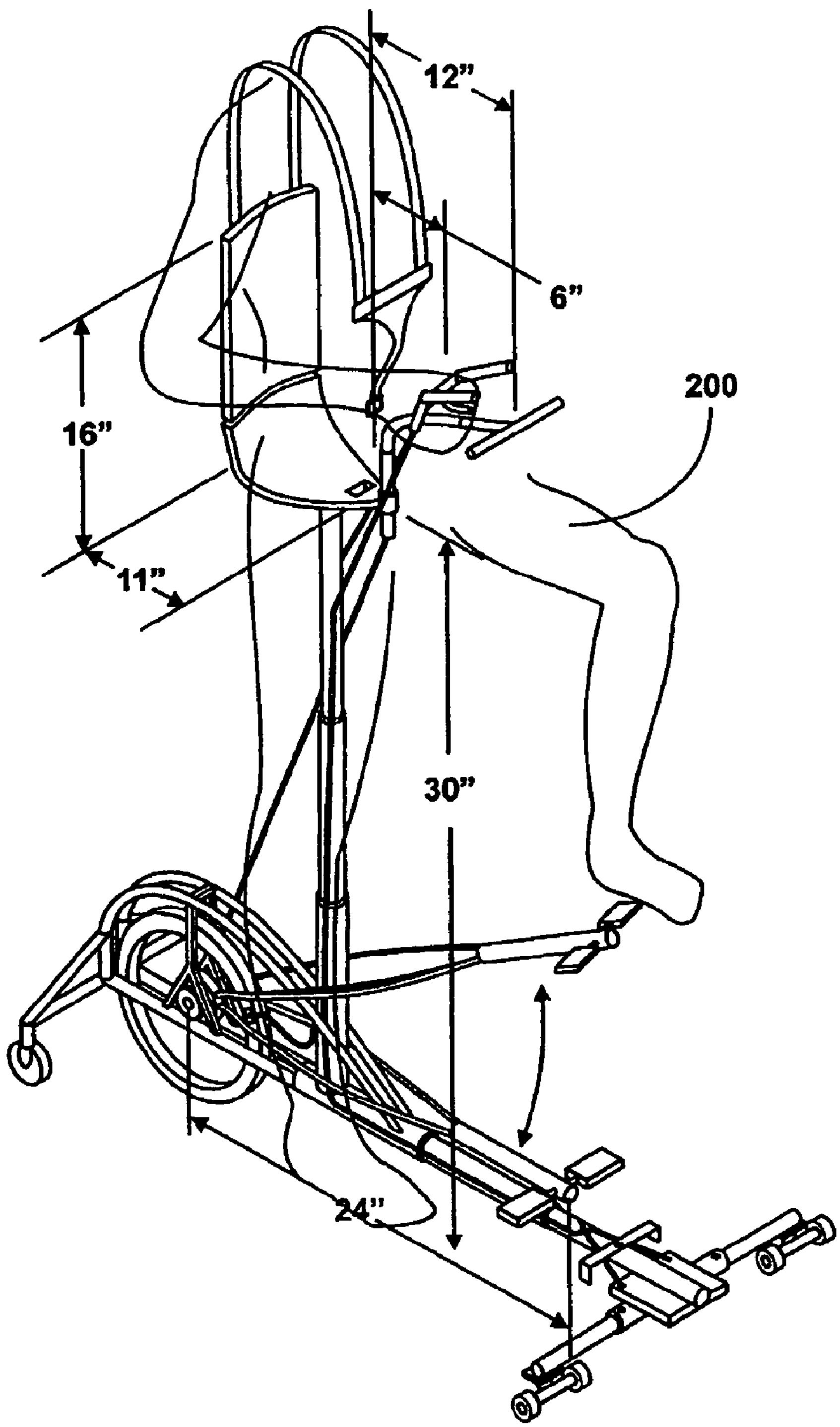
FIG. 8 illustrates the positioning of the user on the apparatus to initiate operation.

Turning to FIG. 8, the orientation of the user in a position to begin use of the apparatus is illustrated. As shown, the user 200 is positioned so as to sit within the receiving structure composed of a seat back support and harness in this particular embodiment. The hand controls are within easy reach of the user permitting an erect torso posture, and the ratchet drive assembly is also within easy reach of the feet of the user. Typically, the receiving structure hand controls and foot controls are positioned such that the upper torso is generally vertical, although a slight forward lean may be integrated into the apparatus. Typically, the upper torso is oriented in a position such that it makes an angle at least 45 degrees with respect to a horizontal plane, typically greater than 60 degrees and even more typically on the order of 80 degrees, noting that a 90 degree orientation would be precisely vertical, and perpendicular with respect to the horizontal plane.

Figure 9:
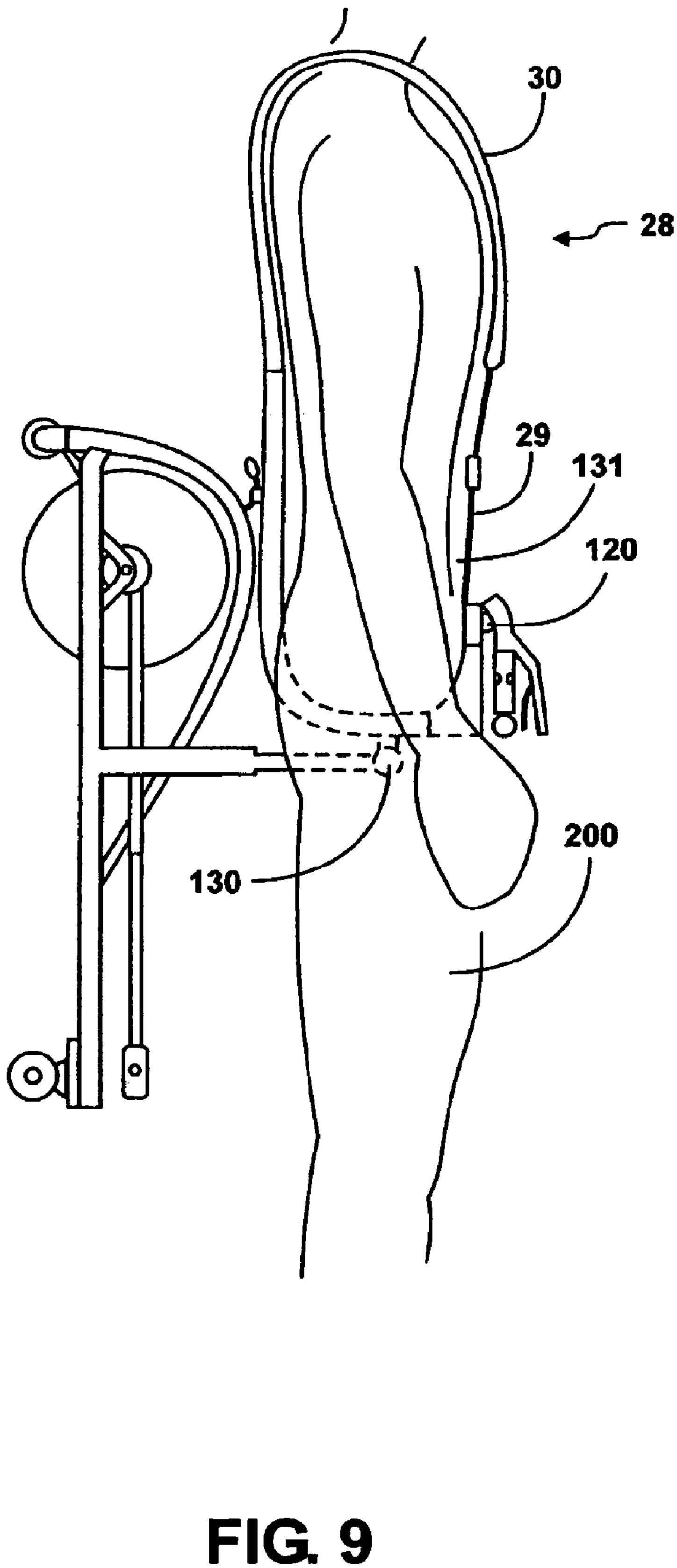
FIG. 9 illustrates a user wearing the apparatus in its collapsed and folded orientation, to permit the user increased mobility by walking without requiring removal of the apparatus.

Turning to FIG. 9, the user 200 is shown to be wearing the apparatus, but in a collapsed and folded position to allow walking, running, etc. By operating the horizontal and vertical collapse features of the apparatus, the apparatus is shortened both vertically and horizontally. In addition, the apparatus is hinged, at hinge 130 so as to allow rotational movement such that the apparatus is moved from a horizontal, deployed position, to a folded vertical position as shown in FIG. 9. In addition, the control pod 34 may be folded downward, by rotation at hinge 120. As illustrated, the frontal torso region 130 of the user is restrained by the harness 28, particularly including shoulder belt 30 and crotch belt 29. By placing the harness on the user and engaging the harness, the receiving structure is provided such that it cradles the user in a vertical direction (i.e., via the seat on which the user rests and the shoulder belts providing a downward retaining force), and lateral directions, including the backrest and the harness.

While in the foregoing embodiments, a seat with a back rest and a harness structure are illustrated as a preferred form of the receiving structure which provides a cradle environment for the user, other configurations may be possible. For example, the harness may be removed, and a contoured support which abuts the abdominal region, such as one that extends vertically from the seat between the legs of the user and which resiliently conforms to the abdominal wall may provide adequate frontal support, particularly in conjunction with a back support. Such a configuration may be combined with a lap belt which is designed to encircle the lower torso abdominal region of the user, so as to attach the apparatus to the user such that the user wears the apparatus. Alternatively, the apparatus may be configured such that the user fits within and is cradled by the receiving structure but not securely attached, which otherwise permits folding of the apparatus and wearing of the apparatus as shown in FIG. 9. In this particular case, typically a harness would not be used, and may be particularly used in conjunction with embodiments that do not fold to enable the user to walk, run, etc.

Figure 10:
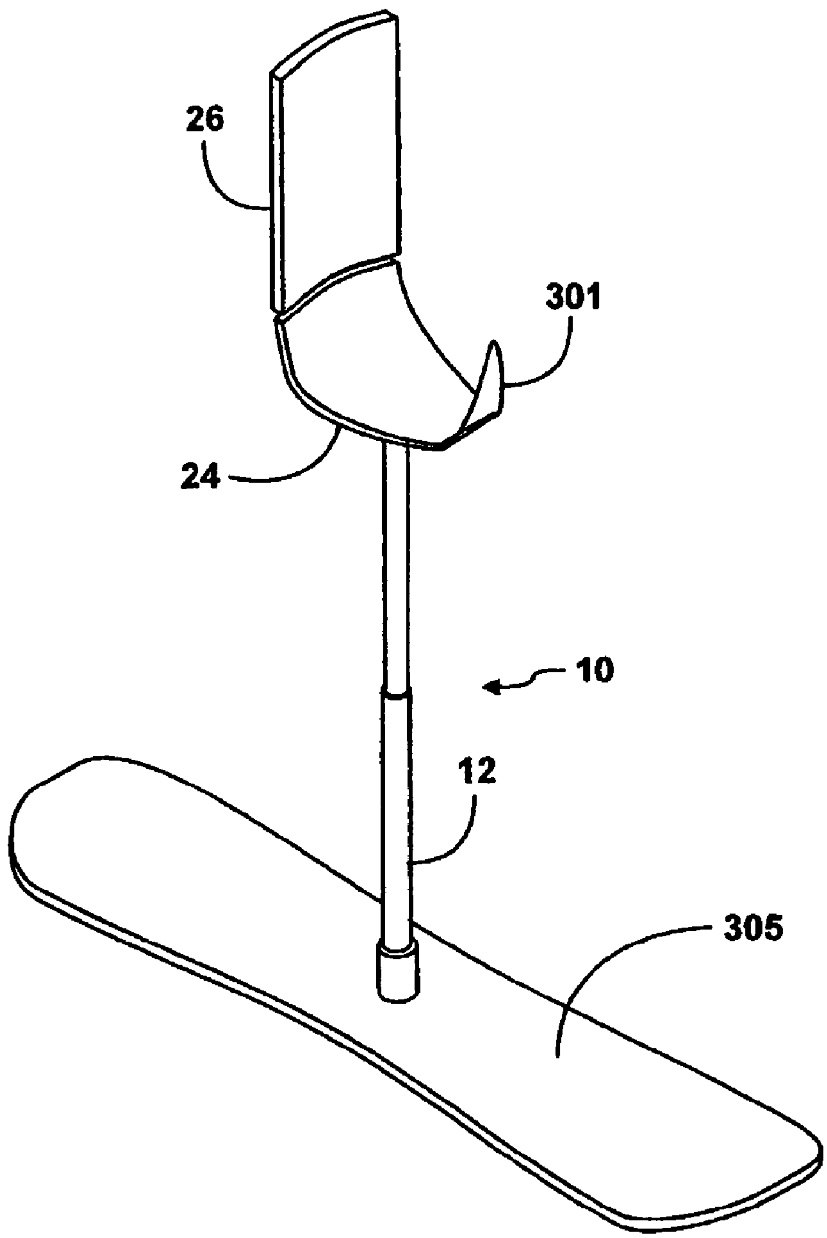
FIG. 10 is a perspective view of another embodiment of the present invention.
Figure 11:
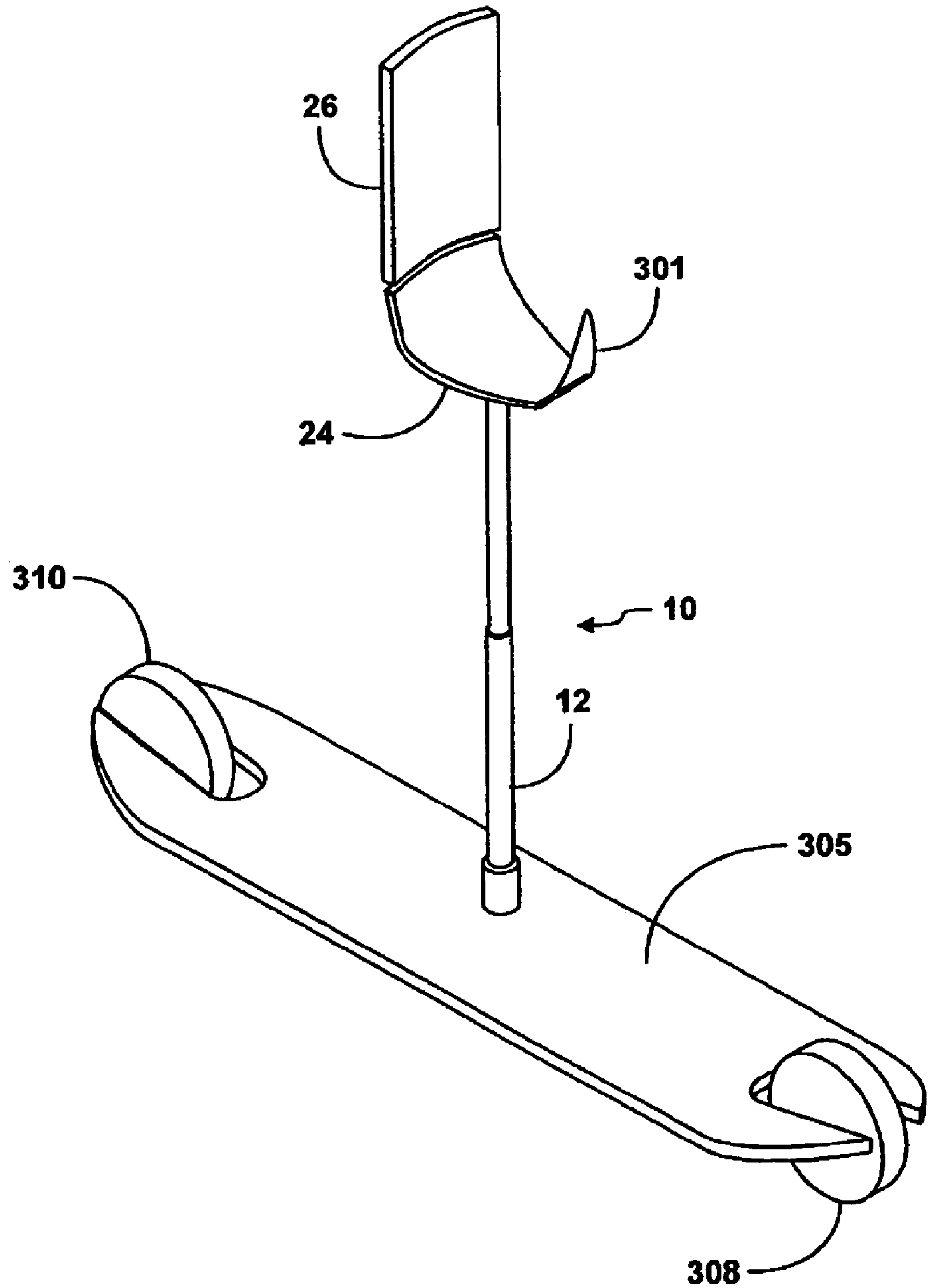
FIG. 11 is a perspective view of yet another embodiment of the present invention.

Turning to FIGS. 10 and 11, additional embodiments are disclosed. As shown, the transportation devices include a frame 10 having a platform 305 which receives and is adapted to support the feet of the user, the platform 305 being adapted to be moved relative to a fixed surface. In the case of the embodiment shown in FIG. 10, the transportation device is a snowboard-derivative, configured to be used much like a conventional snowboard but with the added benefits as disclosed herein. For example, like the embodiments described above, a receiving structure is provided within which the user fits to operate the apparatus, the receiving structure including a seat 44, a back support 26 for supporting a rear torso region of the user, and a frontal support 301 for supporting a frontal torso region of the user, whereby the receiving area is connected to the frame and is positioned such that the user is maintained in a generally erect, standing position when wearing the apparatus.

The embodiment shown in FIG. 11 is similar to that shown in FIG. 10, but is adapted for movement on a hard surface, such as pavement or asphalt. The platform 305 includes front and rear wheels 308 and 310 respectively. The main trunk portion 12 of the frame 10 is telescoping. While in the embodiments shown in FIGS. 10 and 11, a simplified version of the receiving structure is shown, they may also include a complete harness structure, including shoulder belts, a crotch belt, lap belt, etc.

While the foregoing embodiments have focused on user-powered devices, some through use of a mechanical driving mechanism (FIGS. 1–9), a motor for supplying power may be incorporated as well. For example, a motor may be added to supplement a user powered mechanical drive means. In this case, an electric or fuel-powered motor may be incorporated in the manner that hybrid mopeds use such motors. Alternatively, the motor may completely replace the user-powered driving devices. A compact, efficient electric motor may be provided along an aft section of the frame to drive the rear wheel(s) by a linkage (e.g., chain, belt, etc.). In addition, particularly in the case of electric motors that are driven by on-board batteries, the mechanical action of the user-powered driving device, or the rotational movement o the wheels (e.g., when traveling downhill at high velocities) may be harnessed so as to recharge the batteries, thereby providing potentially infinite driving force.

While features of the present invention have been described above in detail, it is understood that modifications to the invention may be made by one of ordinary skill in the art without departing from the scope of the present claims. For example, the driving mechanism may include a fluid pump apparatus which generates a pressure to drive the rear wheel. Whether a fluid pumping system, a ratcheting mechanism or a crank mechanism, the driving mechanisms typically provide a mechanical advantage or leverage effect for driving the rear wheel. In addition, rather than a hand power handle structure as illustrated in FIG. 4, a hand crank mechanism may be implemented, similar to the foot crank mechanism illustrated in FIG. 1, but configured for use by the hands of the user. Further, while a rigid frame has been generally disclosed (some embodiments incorporating collapsibility features and dynamic compression), the trunk of the frame may be supplemented with a resilient cord, such as an elastic cord for tethering the user to the device. In this case, the user may disconnect the rigid frame, thereby disabling it, and rely on use of the elastic cord as a tether. Such features improve the flexibility of the apparatus and permit additional user postures.

What is claimed is:

1. A personal transportation apparatus for a user, comprising:

a frame, the frame including a base portion and a main trunk section;

front and rear wheels connected to the base portion of the frame and being rotatable about respective front and rear axes;

a driving mechanism for driving at least one wheel of the apparatus, the driving mechanism being powered by the user;

a receiving structure within which the user fits to operate the apparatus, the receiving structure including a seat, and a frontal support for supporting a frontal torso region of the user, whereby the receiving structure is connected to the main trunk section of the frame and is positioned such that the user is in a generally upright position when wearing the apparatus; and a hinge along the main trunk section whereby the apparatus may be folded such that the base portion is rotated behind the user to allow walking or running while wearing the apparatus.

2. The apparatus of claim 1, wherein the frontal support includes a restraint belt configured to attach the apparatus to the user.

3. The apparatus of claim 2, wherein the restraint belt comprises at least one shoulder belt anchored to the apparatus and configured to extend over a shoulder of the user and traverse an upper torso region of the user.

4. The apparatus of claim 2, wherein the restraint belt comprises a lap belt anchored to the apparatus and configured to extend over a lap region of the user.

5. The apparatus of claim 2, wherein the restraint belt comprises a crotch belt configured to extend through a crotch area and between the legs of the user.

6. The apparatus of claim 1, wherein the receiving structure further includes a rear support for supporting a rear upper torso portion of the user.

7. The apparatus of claim 1, wherein the receiving structure is height adjustable.

8. The apparatus of claim 1, wherein the main trunk section forms the frontal support of the receiving structure, the main trunk section being positioned so as to extend between the legs and through a crotch region of the user when engaged in the receiving structure.

9. The apparatus of claim 1, wherein the main trunk portion is telescoping and permits longitudinal translation such that the user may move between an erect standing position and a crouched position while wearing the apparatus.

10. The apparatus of claim 1, wherein the main trunk section includes a collapsible portion for reducing an overall size of the apparatus.

11. The apparatus of claim 1, wherein the frame further includes a neck portion, extending in a forward direction from the main trunk section.

12. The personal transportation apparatus of claim 11, wherein the neck portion includes at least one hand grip.

13. The personal transportation apparatus of claim 11, wherein the neck portion includes at least one apparatus control.

14. The apparatus of claim 13, wherein said apparatus control comprises a steering control for orienting a position of the front wheel.

15. The apparatus of claim 1, wherein the apparatus comprises at least two front wheels.

16. The apparatus of claim 1, further comprising outboard auxiliary wheels.

17. The apparatus of claim 1, wherein the driving mechanism comprises at least one gear for providing a mechanical advantage.

18. The apparatus of claim 1, wherein the driving mechanism is powered by the legs of the user.

19. The apparatus of claim 18, wherein the driving mechanism includes a foot operated crank assembly, which is rotated by the legs and feet of the user to power the rear wheel.

20. The apparatus of claim 18, wherein the driving mechanism includes a foot pump assembly.

21. The apparatus of claim 1, further comprising a brake to apply a braking force to the apparatus.

22. The apparatus of claim 21 wherein the braking force is applied to the rear wheel.

23. The apparatus of claim 1, wherein the driving mechanism includes a hand operable mechanism.

24. The apparatus of claim 1, wherein the front wheel is smaller in diameter than the rear wheel.

25. The apparatus of claim 1, wherein the apparatus is configured such that, when wearing the apparatus, the user may operate the apparatus while in a generally upright position, the generally upright position being defined by the upper torso being oriented at an angle which is greater than 45 degrees with respect to a horizontal plane.

26. The apparatus of claim 25, wherein the angle is greater than 60 degrees.

* * * * *